Oct. 12, 1971    R. E. YOUNG ET AL    3,611,574
VORTAC PLOTTER AND METHOD OF NAVIGATION
Filed Dec. 30, 1969    2 Sheets-Sheet 1

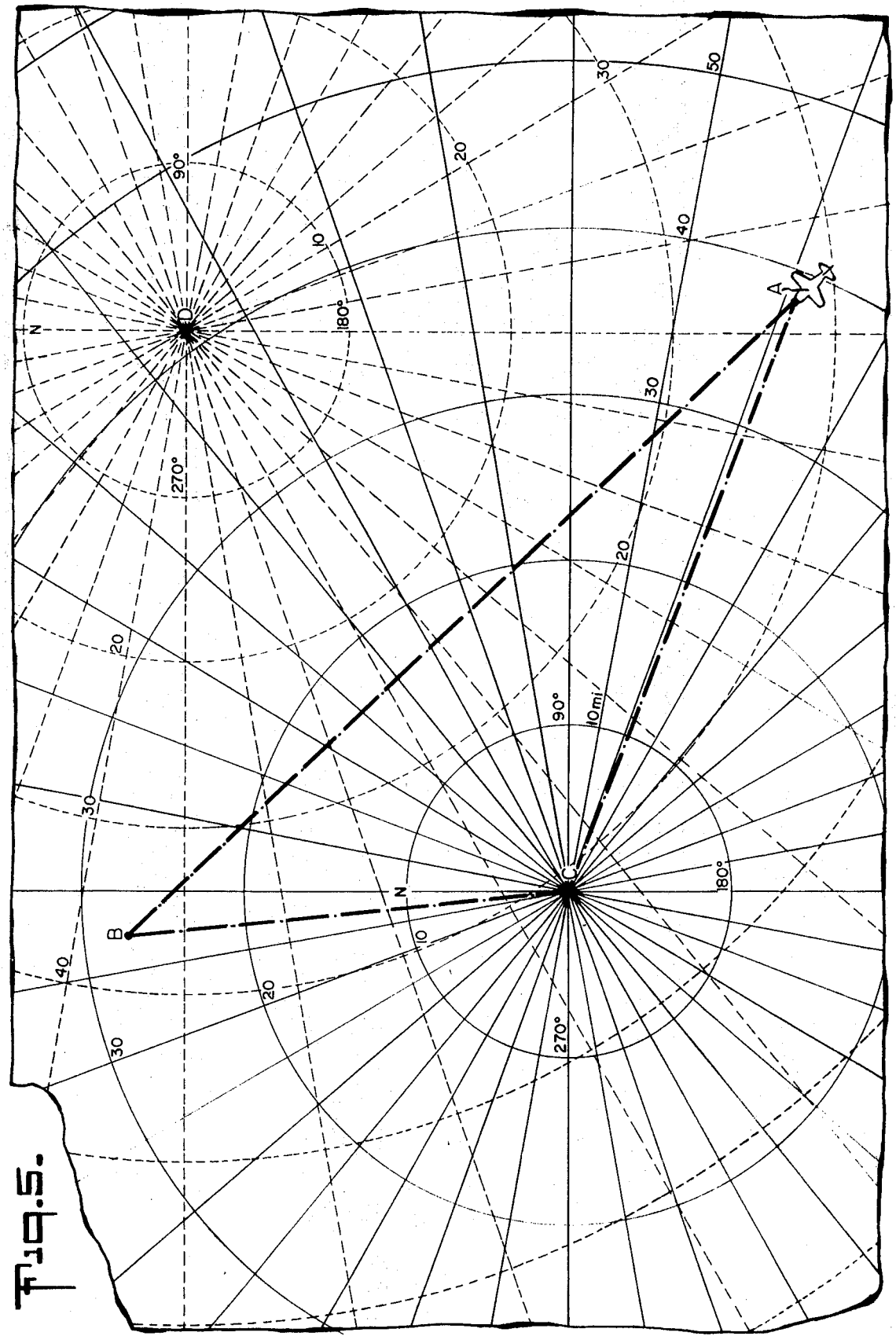

United States Patent Office 3,611,574
Patented Oct. 12, 1971

1

3,611,574
VORTAC PLOTTER AND METHOD OF
NAVIGATION
Richard E. Young, deceased, late of Rocky Hill, N.J., by
Florence E. Young, Rocky Hill, N.J. 08553, Grace
H. Stokes, 53 Harrop Place, Trenton, N.J. 08618, and
First Trenton National Bank, 1 W. State, Trenton,
N.J. 08608, executors
Filed Dec. 30, 1969, Ser. No. 870,664
Int. Cl. B43l 13/20
U.S. Cl. 33—1 SD                       1 Claim

ABSTRACT OF THE DISCLOSURE

A portable device for mechanically correlating distance and directional information and a method of navigation employing the device. The device and method are especially useful for aircraft navigation based on radio range and direction signals. Two superimposed discs rotatable about a common central axis bear polar coordinate and other indicias, and a track scale is universally fixable on the upper disc for direct reading of the range and direction results calculated.

FIELD OF THE INVENTION

The invention relates to a compact navigational plotter and to a method of using the plotter for rapid calculation of position or course on the basis of information received by radio.

DESCRIPTION OF THE PRIOR ART

A system of radio range stations is maintained throughout the United States to aid aircraft pilots in navigating between different points in the country. These stations are VHF omni-directional radio range (VOR) and collocated VOR and TACAN stations (VORTAC) and are generally located within one hundred miles of each other throughout most of the continential United States. By tuning a receiver in an aircraft to the frequency of such a station, one can determine his angular direction from the station which corresponds to the magnetic compass direction, and also learn whether he is approaching or leaving the vicinity of the station by the changing volume of the signal received. Distance measuring equipment (DME) is carried in many aircraft. The DME electronically measures the distance from a VOR or VORTAC station. More common than DME are dual radio receivers which can be tuned to receive signals simultaneously from two different VOR or VORTAC stations. Directional information from two known points can be used by standard triangulation methods to locate a third point, i.e. the receiver.

Thus the existing radio grid and available receiving apparatus provide the data needed for navigation. However, the data receive must be correlated and the calculations required are difficult to perform, especially for a pilot who must at the same time operate the controls of the aircraft and watch the dials of a control panel. Heretofore, the only easy way of correlating the navigational data has been by the use of an electronic computer, but such computers are very expensive and few general aviation aircraft are equipped with them. Another method would be by scaling and drafting on a map or chart, but manipulating a chart and drafting implements in a small aircraft cabin is a distracting and awkward process. Because of these difficulties it has been a common practice to navigate by heading directly toward an information transmitting station in the general direction in which it is desired to travel, and when a point directly over the station or very close to the station is reached, to head out from the station in the desired direction. This eliminates the need for the difficult calculations but results in aerial traffic congestion in the area around the stations.

SUMMARY OF THE INVENTION

The plotting device and method of the invention overcome the difficulties described above and make it a simple matter for a pilot to navigate a direct course between any two points using direction information from VOR or VORTAC stations. The device according to the present invention combines the functions of a calculator and a plotter.

Two transparent discs are pivotally connected at their central portions. One of the discs may be called a field disc, since it bears a polar coordinate grid representing the field of a VOR or VORTAC transmitter with a scale in degrees extending around near the edge of the disc. Radial lines of the field disc grid represent compass heading or directions from the station, the center of the grid represents the station, and concentric circles bearing outwardly increasing numbers indicate radial distance from the station in miles. Distances in navigation are usually measured in nautical miles, so when mileage is discussed hereafter, nautical miles will be meant, and the scales are in terms of nautical miles. The other disc, hereinafter called the track disc, is positioned beneath the field disc. The track disc bears a diametral line, headed at both of its ends by arrowheads. A series of spaced lines parallel to the diametral, double-headed line are marked on the track disc. A track scale of transparent material is adapted to be firmly yet releasably attached to the upper surface of the field disc. Preferably the means for attaching the track scale are a number of special suction cup members. The track scale is elongated and bears a longitudinally extending scale line, with divisions spaced on the same scale as those of the concentric circles of the field disc to indicate distance in miles.

To navigate between two points, the operator marks the points on the face of the field disc according to their respective positions relative to a VOR or VORTAC station chosen as the origin of the polar coordinate grid of the field disc. The track scale is fixed in position with the end of the scale line indicating 0 miles overlying one point marked on the field disc and the line intersecting the other point marked on the field disc. Then the relatively rotatable track disc is turned around its pivot point until its lines extend parallel to the scale line. An arrow head of the diametral line on the track disc then points out the compass heading to be followed to travel between the points. The plotter is also particularly useful in connection with a specially prepared chart having polar coordinate rulings extending from each VOR or VORTAC station, since it is then possible to determine the position and to plot the course of an aircraft by using only the directional data from any two stations within broadcast range.

It is accordingly an object of the invention to provide a method and device for quickly and easily correlating distance and direction data received from stations transmitting such information.

Another object of the invention is to provide a method and a readily portable device for rapid computation of distance and direction from directional information received from two VOR or VORTAC stations.

A further object is to provide a method and device for navigation by use of information received by radio which can be advantageously used in connection with a specially prepared chart.

Another object is the provision of effective and simple means for securing a track scale member to a rotatable disc in a portable computing and plotting device.

Additional objects and advantages of the invention will become apparent from the following detailed description taken in conjunction with the accompanying drawings, which illustrate a preferred embodiment of the invention.

In the drawings:

FIG. 2 is a sectional view of the plotter taken along line 2—2 of FIG. 1 and looking in the direction of the arrows.

FIG. 5 is a schematic plan view of a chart ruled in accordance with the invention, illustrating the use of the plotter.

Figure 1:
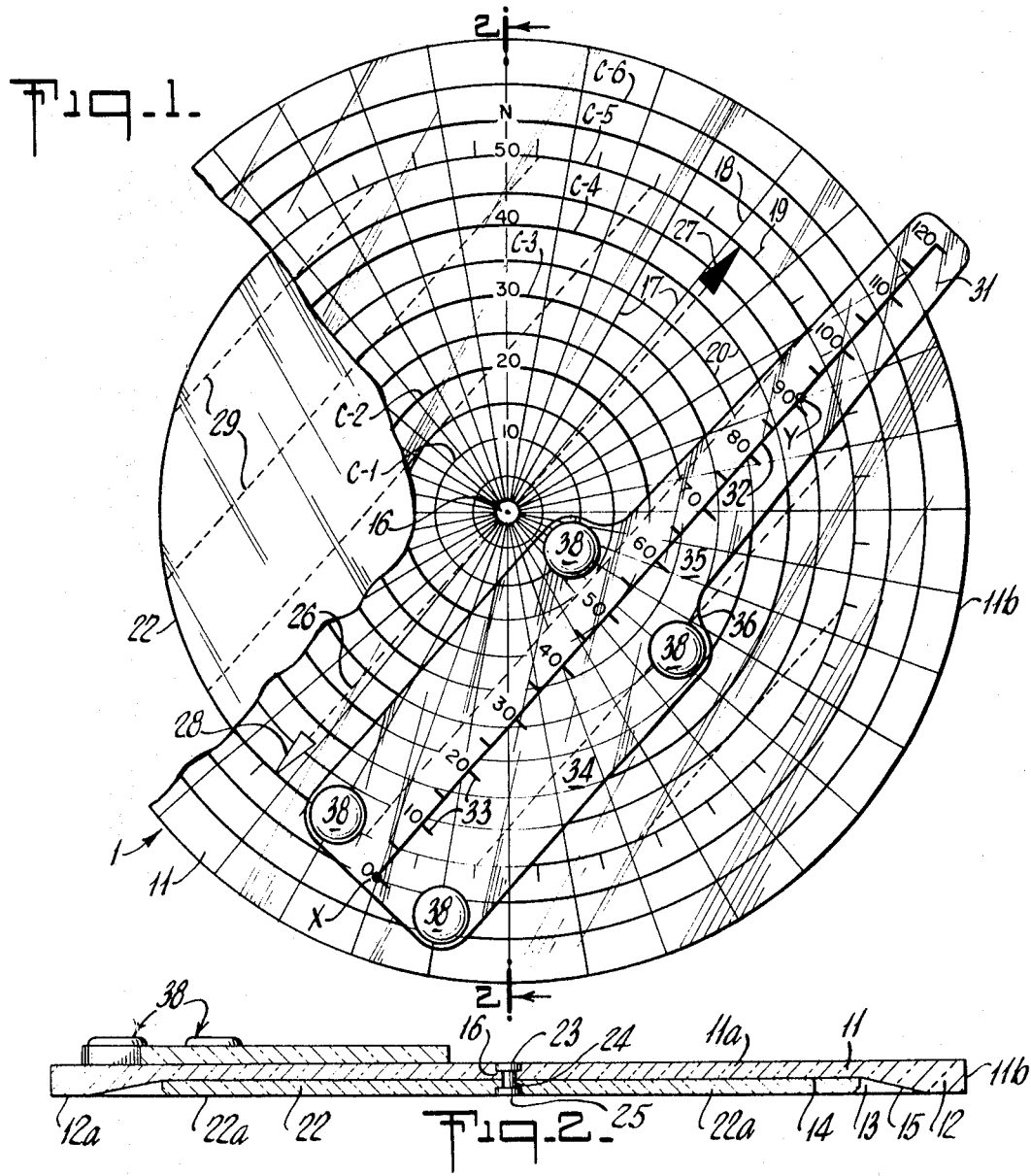
FIG. 1 is a top plan view of the VORTAC plotter of the invention, with part of the field disc cut away.

Referring to FIGS. 1 and 2, in which the portable plotter is generally indicated by the reference character 1, a flattened, substantially circular field disc 11 is seen to be pivotally connected to a substantially circular track disc 22. The field disc 11 bears indicia to be discussed hereafter on its upper, flat surface 11a and has a concentric generally circular, downwardly directed lip 12 around its periphery which defines a generally circular well 13 formed in the bottom of disc 11. The well 13 has a flattened base 14 and preferably has an inclined bordering annulus 15 meeting the undersurface of the lip 12 just inward of the periphery 116 of the field disc 11.

Seated within the well 13 with its periphery lying just radially inwardly of the commencement of the annulus 15 is the track disc 22. This disc is pivotally connected concentrically at its central portion 25 to central portion 16 of the field disc 11 by a rivet or pin 23, which extends through a hole 24 in the track disc 22. The ends of the pin 23 preferably lie flush with the upper surface 11a of the field disc 11 and with the lower surface of track disc 22. The tapered annulus permits easy hand engagement for manual turning of the track disc 22 relative to the field disc 11. Preferably the under surface 22a of track disc 22 lies flush with the undersurface 12a of the lip 12. Both the field disc 11 and the track disc 22 are preferably formed of hard transparent plastic synthetic resinous material so that indicia on the track disc 22 can be seen through the field disc 11.

Polar coordinate field indicia comprising equally angularly spaced radial lines 17 and equally spaced concentric circles C are etched or otherwise marked on upper surface 11a of the field disc 11. Preferably six concentric circles C–1 to C–6 marked on surface 11a of the field disc 11 bear sucessively the numbers 10, 20, 30, 40, 50 and 60 indicating mileage in multiples of 10 from the center 16 of the field disc 11 outwardly as shown in FIG. 1. Intermediate un-numbered circles as shown may indicate intermediate five mile positions.

An etched or printed compass rose with an N for North and radial angles from 10° to 350° (not shown) encircles the disc 11 in the zone 18, preferably at the 50 mile circle C–5, near the periphery 116 of the disc. Five degree divisions are preferably indicated by short lines 19 spaced between the radial lines 17 in the compass rose 18.

Track disc 22 bears a dashed diametral line 26 having arrow heads 27 and 28 on opposite ends thereof. One arrow head 27 is preferably dark and the other arrow head 28 is preferably in hollow outline as shown in FIG. 1. A series of spaced, dashed lines 29 marked on the track disc 22 lie parallel to the diametral line 26. In the preferred embodiment illustrated in FIG. 1 the track disc 22 is of such a size that the peripheral edge of disc 22 lies directly below the circle C–5 of the field disc 11 which indicates 50 miles, so that the compass rose markings 18 will not be obscured by the user's viewing of the dashed lines 26, 29 on the track disc through the transparent field disc 11, yet the lines 26 and 29 will be visible throughout their length for correlation with other scale indicia on the other transparent elements of the plotter 1.

A track scale formed of transparent material and generally indicated by the reference character 31, as shown in FIGS. 1 and 2, is adapted to be positioned anywhere upon the surface 11a of field disc 11 and is thus universally fixable with respect to the polar coordinate grid marked thereon as described above. The track scale 31 bears an elongated central longitudinal line 32 etched or otherwise marked thereon. Scale divisions 33 are marked in tens of miles from 0 miles to 120 miles as shown in FIG. 1, with un-numbered five mile divisions therebetween. Although the track scale 31 could be of any shape suitable for bearing the described scale markings, in the preferred form as shown in FIG. 1 the track scale 31 has an elongated generally rectangular portion 34 and a tapering, elongated, longitudinally extending portion 35 of smaller width than the rectangular portion 34. For safety and comfortable manipulation the track scale 31 has rounded corners and the inner angles 36 where portion 34 joins portion 35 are gently curved.

An unique mounting system permits the fixation of the track scale 31 anywhere on the surface 11a of field disc 11 while allowing easy removal for re-positioning of the track scale. The securing means includes a plurality of special suction cup elements 38, four of which are shown in the embodiment of FIG. 1. The suction cup elements 38 are preferably located at the corners of an imaginary rectangle situated within the rectangular portion 34 of the track scale 31, so that any two of the suction cup members 38 will serve to secure the track scale 31 fixedly with respect to the field disc 11. As shown in FIG. 2, the structure of the suction cup members 38 permits the mounting of the track scale 31 flat against the surface 11a of the field disc 11.

Figure 3:
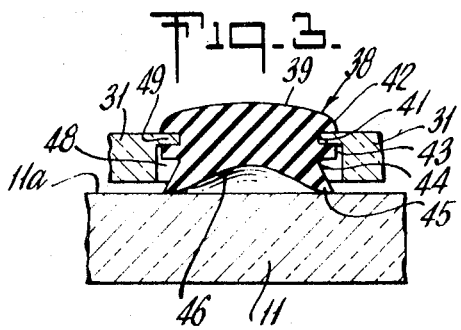
FIG. 3 is a view in section of a preferred suction cup securing means of the invention taken through a diameter of the suction cup in relaxed position.
Figure 4:
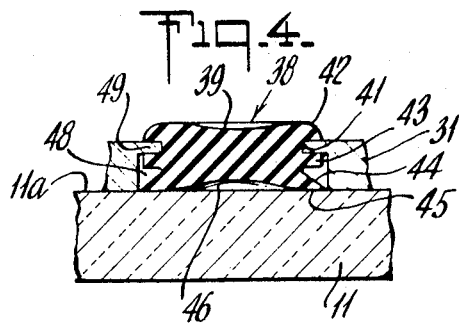
FIG. 4 is a view similar to FIG. 3 showing the suction cup in its engaged, depressed state.

Referring now to FIGS. 3 and 4, the details of the special suction cup members 38 can be seen. The suction cup members 38 are preferably integrally formed of rubber or synthetic elastomeric material. Each member 38 is generally circular in plan view, with a substantially dome-shaped portion 39 forming the upper part thereof and a generally cylindrical body. A substantially circular peripheral groove 41 is formed around the member 38 below the dome-shaped portion 39, the groove being defined between an overhanging annular lip or flange and an underlying annular lip or flange 43 extending outwardly from a central portion of the body of the suction cup member 38. Another generally circular lip 45 having a tapering profile in cross section as shown in FIGS. 3 and 4 extends downward from the lower part of member 38 to define a normally dished cup-like base surface 46 centrally thereof.

Substantially circular holes or apertures 48 formed in the track scale 31 receive the members 38. The track scale 31 is provided at each hole 48 with an annular rim or flange 49 extending inwardly around the hole 48. The member 38 is compressibly fitted into the hole 48 with rim or flange 49 compressibly received into its peripheral groove 41. As shown in FIGS. 3 and 4 the rim of flange 49 is preferably flush with the upper surface of the track scale 31. Below the rim of flange 49 the hole 48 is somewhat larger in diameter than the member 38 to allow resilient deformation of the member 38 for engagement with the surface 11a of field disc 11.

FIG. 3 shows a member 38 in relaxed position, with the base thereof in a very concave attitude. Manual depression of the dome-shaped portion 39 of the member 38 compresses the member against the surface 11a of field disc 11, expelling air from the space beneath base 46 and spreading the tapered lip 45. This secures the track scale 31 firmly against the surface 11a of the field disc 11 as shown in FIG. 4. The dome-shaped portion 39 of member 38 attempts to return to its relaxed position but is restrained from doing so by the suction beneath base 48. The force generated by dome portion 39 is accordingly exerted compressively on the lip 49 of the track scale 31, firmly holding the track scale in place.

Referring now to FIG. 5, schematically illustrating the overlapping ranges of two VOR or VORTAC stations, one manner of using the plotter of the invention can be readily understood. An aircraft is symbolically represented at point A and point B represents a particular destination. The reference characters C and D indicate the locations of two stations broadcasting navigational information. The polar coordinate lines surrounding stations C and D represent the VOR or VORTAC fields of the stations. Only two stations are shown, though, of course, several stations would usually appear on any chart covering a large area, since such stations are generally situated within one hundred miles of each other throughout most of the continental United States. A polar coordinate field grid similar to the grid marked on field disc 11 surrounds each station with radial lines at 10 degree angles and concentric circles indicating distance from the station. Preferably each VOR or VORTAC station would have its radio field coordinates marked in a different color ink on the chart. This feature is indicated by the use of solid lines for the field of station C and dashed lines for the field of station D. A compass rose with an N for North and directions marked in degrees surrounds each station on one of the circular lines indicating distance from the station, e.g. a ten mile circle as shown. The distances and radial angles would preferably be indicated in the same color ink as the field lines of the stations to which they refer, at appropriate locations on the chart. Such a chart would enable a pilot to directly read the location data of any point in terms of polar coordinates of the field of a VOR or VORTAC station within range of the point. In accordance with one method of use of the invention, an aircraft navigational chart provided with polar coordinate grids marked around each station broadcasting navigational information permits easy correlation of directional information from any two stations within range of a receiver of an aircraft when used in connection with the plotter of the invention.

METHOD OF NAVIGATION

Depending upon what navigational information is available to the operator, probably the pilot of a general aviation aircraft, the plotter may be advantageously used in several ways, a few of which will now be described.

NAVIGATION USING DISTANCE MEASURING EQUIPMENT

In an aircraft equipped with a VOR receiver and DME the operator receives radial directional information and distance information from a station broadcasting such information. This data locates his aircraft at a specific point in a VORTAC field. In this example it is assumed that the radial and distance coordinates of the desired destination are known, for example, from a standard chart. The plotter can then be employed to determine the direction and distance to be flown on a straight course to the destination. In the illustration of FIG. 1 the position of the aircraft, as determined from information received on a VOR receiver and DME, is on the 200 degree radial and 55 miles away from a VORTAC station. The center 16 of the field disc 11 is taken to represent the station and the Point X corresponding to the coordinates of the aircraft's position with respect to the station, is selected in the polar coordinate grid. A mark may be made at that point, for example with a grease pencil. Point Y, the destination, is known to be on the 70 degree radial and 45 miles from the station. Point Y is located on the field disc 11 as shown and it also may be marked. Then the track scale 31 is placed on the field disc 11 with its zero miles point overlying Point X and its track center line 32 passing directly above Point Y. The track scale is pressed down to affix the suction members 39 and, once affixed, remains stationary with respect to field disc 11. The distance from Point X to Point Y can be read directly from the scale as approximately 91 miles.

To determine the compass heading to be followed, the track disc 32 is then rotated until its dashed lines 29 are arranged parallel to the line 32 of the track scale 31. One of the several lines 29 will always be near enough to the line 32 for easy and accurate alignment. The diametral line 26 of the track disc now indicates the direction to be travelled in the VORTAC field to go from Point X to Point Y. The angular directions in the VORTAC field correspond to the conventions accepted to define directions in the magnetic field of the Earth, so the direction determined corresponds to the compass direction. This direction can be read from the compass rose 18 at the place pointed at by arrow head 27, in this case 42 degrees. Thus the pilot has quickly determined that he must fly at a 42 degree compass heading for 91 miles to get to Point Y. Of course he must allow for drift, but any point along the course he can easily correct for drift by repeating the computation as above. Such a course is a direct and precise track between any two points within range of the station and avoids the congestion which frequently arises over VORTAC stations since it is not necessary to approach the station.

NAVIGATION USING CHART WITH POLAR RULINGS

The plotter may also be advantageously used in conjunction with a chart ruled in accordance with the invention to provide the polar coordinates of any point on the chart with reference to all VOR's or VORTAC's within radio range. Such a chart is schematically illustrated in FIG. 5 and described above. In FIG. 5, Point A, which might be a small airport, could be located thus with respect to stations C and D by simply looking at the specially marked chart:

Station C, 111 degrees, 38 miles
Station D, 177 degrees, 37 miles

Any combination of two of the above figures will serve to locate Point A positively with respect to a VOR or VORTAC field, thus providing the information required to set up the plotter.

This means that if airborne DME is not available, as as the case with many general aviation aircraft, directional information from two stations may be used. Dual radios are in more common use in small aircraft than DME, and two such radios, one tuned to station C and one tuned to station D, would give the necessary data to locate Point A on a chart ruled according to the invention. The point could then be found on the chart and the distance from, say, station C read off. The distance and direction data with respect to station C would enable the operator to mark Point A on the field disc 11 of the plotter, taking station C as the center 16 of the field. With respect to station C, Point B's coordinates are 354 degrees and 28 miles. Marking in Point B from information read off the chart or otherwise known would make it possible to set up the plotter in the manner explained above and to plot a direct course from A to B.

Besides avoiding congestion in the vicinity of a VOR or VORTAC station, the plotting of a direct, straight line course can save time and fuel by shortening the distance to be travelled. The dot and dash lines of FIG. 5 illustrate the alternative courses from A to B. Flying directly along line AB on a course determined by use of the plotter as described above means travelling about 56 miles. If the plotter were not used and one flew along the legs AC and then CB, that is first to the station C and thence to Point B, one would have to go 38 miles plus 28 miles or 66 miles. Flying the direct course AB with the benefit of the plotter saves 10 miles.

Of course, if one is within range of two VOR or VORTAC stations it is not necessary to receive their signals on dual radio receivers, since one receiving set could be switched from the frequency of one station to the other for successive reception of directioinal information.

A chart as schematically illustrated in FIG. 5 can obviously be used in several other advantageous ways in connection with the plotter of this invention because of its being ruled in polar coordinates on the same system as the plotter. The great advantage of the use of such a chart along with the plotter is that no scaling or drafting need be done by the operator.

It is to be understood that the above described embodiments of the invention are for purposes of illustration only and that various changes may be made without departing from the spirit and scope of the invention. For example, the plotter could be used advantageously for marine navigation.

What is claimed is:

1. A navigational instrument comprising a first disc, a second disc, said first and second discs being pivotally connected to each other at the central portions thereof, a polar coordinate grid formed on an upper surface of said first disc, said grid including angularly spaced radial lines and a series of spaced circles concentric with the periphery of said first disc, a series of spaced parallel lines marked on said second disc, one of said parallel lines being a diametral line, and a track scale member of transparent material having a longitudinally extending track line and means for securing said scale member anywhere on said upper surface of said first disc, said securing means including a plurality of suction cup members affixed to said scale member, said suction cup members each being integrally formed and including a dished-out base for suction attachment to said first disc and a dome-shaped upper portion, a peripheral groove cut into said member below said dome-shaped portion compressibly receiving the edges of an aperture in said scale member.

References Cited

UNITED STATES PATENTS

| | | | |
|---|---|---|---|
| 2,210,773 | 8/1940 | Niemeyer | 33—1 (SD) |
| 2,485,674 | 10/1949 | Suiter | 33—76 X |
| 2,979,821 | 4/1961 | Tengwall | 33—1 (SD) |
| 3,063,626 | 11/1962 | Kritser | 33—76 (VA)X |
| 3,178,826 | 4/1965 | Aisen | 33—107 |
| 3,193,195 | 7/1965 | Jeffries | 235—61 (Nav) |
| 3,526,963 | 9/1970 | Pansmith | 33—1 (SD) |

WILLIAM D. MARTIN, JR., Primary Examiner

U.S. Cl. X.R.

33—76 VA, 107; 235—61 NV